United States Patent [19]

Morris

[11] 3,916,120

[45] Oct. 28, 1975

[54] TESTING REPEATERS

[75] Inventor: Raymond Keith Morris, Newport, England

[73] Assignee: International Standard Electric Corporation, New York, N.Y.

[22] Filed: Apr. 19, 1974

[21] Appl. No.: 462,251

[30] Foreign Application Priority Data

June 14, 1973 United Kingdom ............... 28288/73

[52] U.S. Cl. ........................................ 179/175.31 R

[51] Int. Cl.² ............................................ H04B 3/46

[58] Field of Search ............. 179/175.31 R, 175.3 F, 179/175.3 R

[56] References Cited

UNITED STATES PATENTS

| | | | |
|---|---|---|---|
| 3,189,694 | 6/1965 | Frankton | 179/175.31 R |
| 3,325,605 | 6/1967 | Brewer | 179/175.31 R |
| 3,637,955 | 1/1972 | Tilly et al. | 179/175.31 R |

*Primary Examiner*—Kathleen H. Claffy
*Assistant Examiner*—Douglas W. Olms
*Attorney, Agent, or Firm*—J. B. Raden; D. P. Warner

[57] ABSTRACT

Apparatus is disclosed for monitoring the performance of a plurality of repeaters in a transmission line. Each repeater incorporates a filter tuned to a frequency individual to that repeater and first means for changing the frequency of the received signal which may introduce a frequency error. A frequency synthesizer provides a test signal at a predetermined discrete frequency, varies the frequency according to said error and provides a reference frequency signal. A phase detector is employed to indicate when the reference frequency signal and the test signal received from the repeater under test are the same, whereby said error can be determined and compensated for.

7 Claims, 6 Drawing Figures

TESTING REPEATERS

BACKGROUND OF THE INVENTION

Field of the Invention

This invention relates to monitoring repeaters in transmission systems, and particularly, but not exclusively, to monitoring as it relates to repeaters in submarine cable systems.

SUMMARY OF THE INVENTION

According to the present invention, there is provided testing apparatus for testing the performance of repeaters in a transmission link, the link comprising a plurality of repeaters each having a filter tuned to a frequency individual to the pertinent repeater through which filter the test signal will pass in testing that repeater and first means which will change the frequency of the signal received by the repeater and which may introduce a frequency error, the apparatus comprising a frequency synthesizer for providing the test signal at any one of a plurality of predetermined discrete frequencies, second means operable to change each discrete frequency by an amount which can be varied according to said error, third means for providing a reference frequency signal, and a phase detector arranged to indicate when the reference-frequency signal and the test signal received from the repeater are the same, whereby the error can be determined.

According to another aspect of the present invention there is provided testing apparatus for testing the performance of repeaters in a transmission link, the link comprising a plurality of repeaters each having a filter tuned to a frequency individual to the pertinent repeater through which filter the test signal will pass in testing that repeater and first means which will change the frequency of the test signal by an amount which varies from repeater to repeater after it has been transmitted to the transmission link, the apparatus comprising a frequency synthesizer for providing a test signal at any one of a plurality of predetermined discrete frequencies, second means operable to vary the frequency by an amount large enough to embrace all the variations caused by said first means, and automatic control means operable to control the synthesizer and the second means according to a program of testing the repeaters sequentially whereby the frequency of the transmitted test signal is varied from a first value to a second value to embrace only the bandwidth of the filter of the pertaining repeater under test, the frequency slot between said first and second values being smaller than the amount of frequency variation available at said second means.

BRIEF DESCRIPTION OF THE DRAWINGS

In order that the invention can be clearly understood reference will now be made to the accompanying drawings wherein.

DESCRIPTION OF A PREFERRED EMBODIMENT

Figure 1:
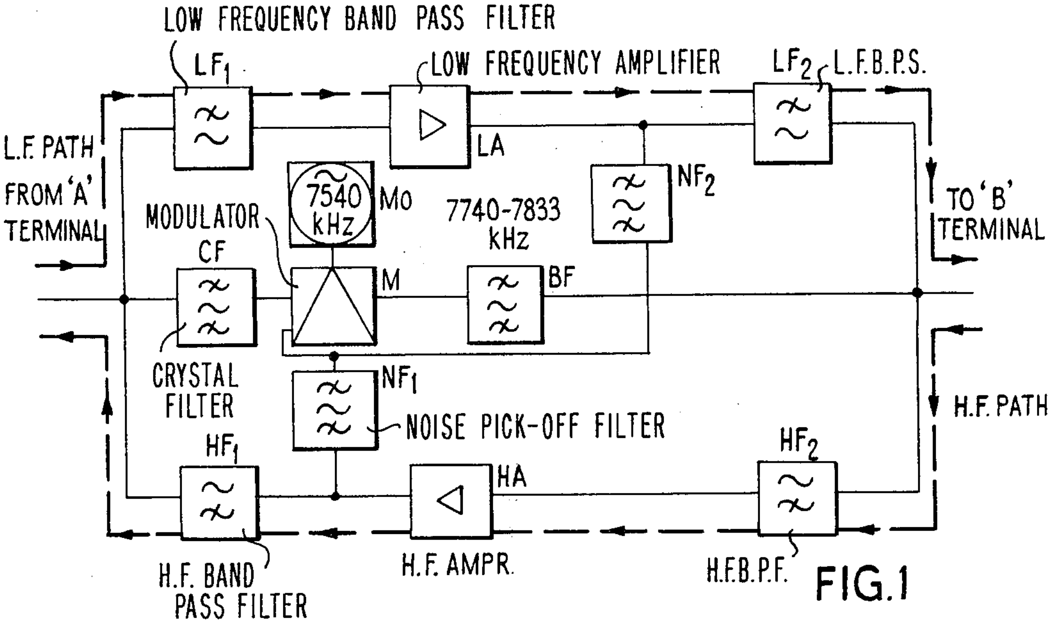
FIG. 1 is a block diagram of a two-way repeater for a submarine cable system according to an embodiment of the invention.

Referring to FIG. 1, a two-way repeater comprises a low frequency traffic path from terminal A to terminal B and a high frequency traffic path from terminal B to terminal A. The path from A to B includes low frequency band pass filters $LF_1$, and $LF_2$ and a low frequency amplifier LA. The repeater provides a high frequency traffic path from the terminal B side to the terminal A side including high frequency band pass filters $HF_1$, and $HF_2$ and a high frequency amplifier HA. The repeater includes a bidirectional supervisory circuit comprising a crystal pick-off filter CF just outside the low frequency band, a modulator M, a local oscillator MO, a band pass filter BF just outside the high frequency band, and two noise pick-off filters $NF_1$, $NF_2$.

The crystal filter CF has a very narrow pass band frequency, of the order of 10 of Hz. A different frequency is transmitted to the corresponding crystal filter of each repeater of the system, the frequency spacing being of the order of a few hundred Hz. The crystal filters lie, as mentioned, just outside the low frequency band in a low supervisory band.

Figure 2:
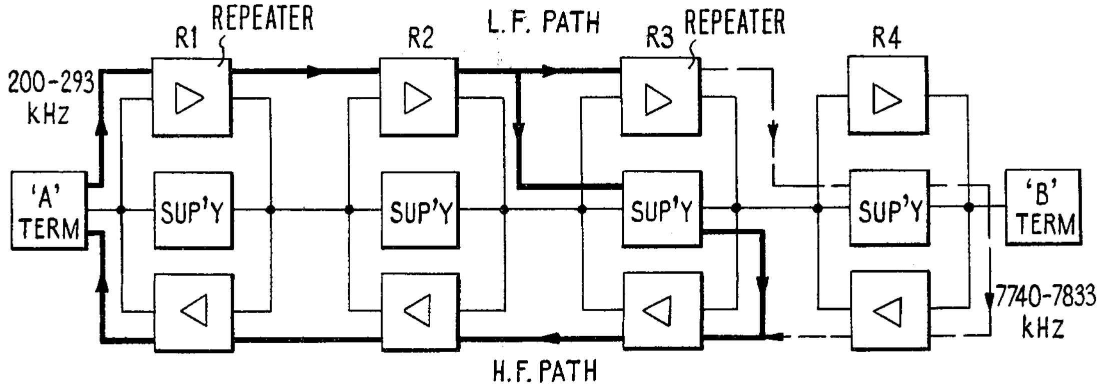
FIG. 2 is a simplified block diagram of the system.

Referring to FIG. 2, the system is shown to include four repeaters R1, R2, R3 and R4 connected in a coaxial transmission path between terminals A and B. The heavy line indicates the path of a supervisory signal for testing repeater R3; for example, testing loop gain.

The supervisory signal is provided at an accurately controlled frequency, for that particular repeater, within the low supervisory band, and is transmitted from the submerged repeater monitoring equipment at terminal A via the low frequency band path of R1 and R2 to the crystal pick-off filter CF of R3. This signal is then modulated with the local oscillator to give a second signal at a higher frequency which lies within the high supervisory band (lying just outside the traffic high band). This second signal is fed via the band pass filter BF and returned to terminal A via the high frequency band path of R3, R2 and R1 for measurement.

The foregoing procedure enables tests to be made of the supervisory circuit and the high frequency path of repeater R3 for correct functioning. To check the low frequency path of R3, it will be necessary to repeat the process by sending a signal at a frequency appropriate for repeater R4. If a fault condition exists, the fault may be in the low frequency amplifier of R3 or in the high frequency amplifier of repeater R4. The Receive pilot meters at the A and B terminals will indicate whether the failure is in the high band or low band transmission paths as appropriate.

If now it is required to measure the loop gain through say repeater R3 from the B terminal, an accurate frequency for that particular repeater, located within the high-frequency supervisory band is transmitted from the B terminal submerged repeater monitoring equipment via the high frequency band path of repeater R4 to the band pass filter BF in the supervisory circuit of Repeater 3. This signal then modulates with the local oscillator MO in Modulator M to give a frequency within the low supervisory band, in particular the frequency of the crystal filter CF of repeater R3. This signal is then returned via the low band path of repeater R3 and R4 to the B terminal monitoring equipment for measurement. This enables checks of the supervisory circuit and the low band path of repeater R3 for correct functioning. But, to check the high band path of repeater R3, it will be necessary to repeat the process by sending the appropriate frequency for repeater R2. If a fault condition exists, the fault may be in the high frequency band amplifier HA of repeater R3 or in the low frequency band amplifier LA of repeater 2. The Receive pilot meters at the A and B terminals will indicate whether the failure is in the high band or low band transmission paths, as appropriate.

The transmission frequencies of the noise filters NF 1 and NF 2 (FIG. 1) lie in the high supervisory band enabling these filters to be used in making second harmonic, third harmonic, third order inter-modulation and noise measurements.

The local oscillator MO in each repeater is preferably a crystal-controlled oscillator and lies in the high frequency band. High frequency in the embodiment of the invention being described would be in the region of 7 MHz. The frequency variation of this oscillator may be 250 Hz in either direction. Clearly therefore, in measuring loop gain from terminal B, the frequency produced by the modulator M might lie anywhere in the low supervisory band within 250 Hz on either side of the nominal frequency of the crystal pick-off filter CF. The spacing between the pick-off filters CF is, as stated, typically of the order of 100's of Hz, in particular in this embodiment 150 Hz. Thus difficulty may arise as to which repeater will in fact be tested when a particular test signal is transmitted because it is conceivable that the modulation product frequency will lie in any one of the three frequency adjacent crystal filters CF of three different repeaters.

The errors in the frequencies exhibited by the various oscillators MO originate from different sources and are of the order of:

a. ± 75 Hz manufacturing tolerance which can be determined by measurement after manufacture, b. ± 75 Hz error due to ageing which, we have discovered, follows an approximately logarithmic characteristic, most of the change in frequency due to ageing taking place within the first 12 to 18 months from manufacture and can be reasonably accurately estimated, c. ± 75 Hz due to temperature variations which take place continuously in use and are to some extent unknown.

It is proposed to determine the error existing in oscillator MO so that the position of the oscillator band within the possible band width of about 500 Hz can be determined for each repeater. In the embodiment described a bandwidth error of 560 Hz is taken to embrace other possible errors.

Figure 3:
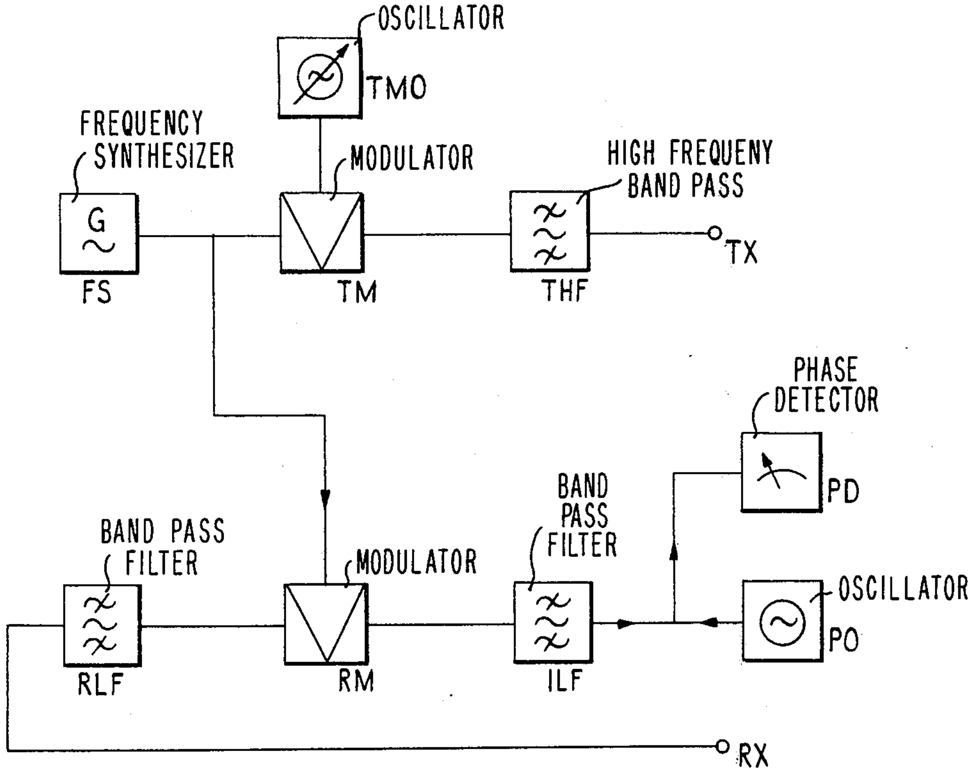
FIG. 3 is a block diagram of part of terminal equipment for the submarine cable system.

Referring to FIG. 3 there is shown in simplified form a block schematic diagram of part of the monitoring equipment at terminal B. The equipment comprises a frequency synthesizer FS for providing test frequencies corresponding to but not equal to the various frequencies of the repeater crystal filters CF. This synthesizer feeds a modulator TM associated with an oscillator TMO whose frequency is variable over narrow limits, e.g., ± 250 Hz. The modulator produces a frequency within the high supervisory band which is transmitted at transmit terminal Tx to the high band path via high frequency band pass filter THF and which is representative of a particular repeater, say R3 whose crystal filter frequency is for example 250 KHz. If the local oscillator in repeater R3 is actually at nominal frequency, there will be received back at receive terminal Rx the frequency 250 KHz.

If however the local oscillator MO is say 200 Hz off nominal frequency then in order to test this repeater the oscillator TMO is adjusted to scan the narrow range until the characteristic frequency (250 KHz) of repeater R3 is received at R*x*. The difference between the nominal frequency of oscillator TMO and the adjusted frequency gives a measure of the difference between the nominal and actual frequencies of local oscillator MO for repeater R3.

Figure 4:
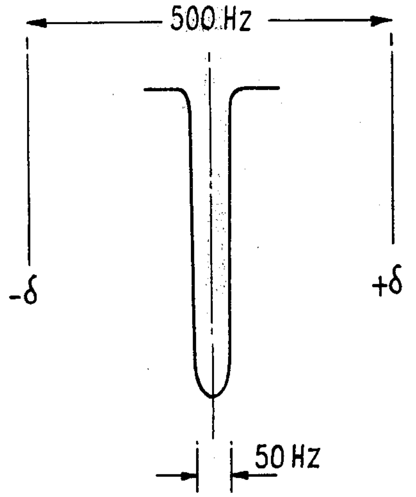
FIG. 4 is a typical loop gain characteristic of the repeater as measured from the terminal equipment.

As the scanning of the oscillator TMO takes place and the frequency transmitted at transmit terminal T*x* varies between $-\delta$ and $+\delta$, the received signal will appear as shown in FIG. 4 to give the loop gain characteristic via repeater R3. In FIG. 4 it has been assumed that the local oscillator of repeater R3 is actually at nominal frequency. If it were not, as expected, then the filter characteristic would appear displaced to one side or the other of the band of frequency variation. Also the frequency of filter CF would not lie within the actual band of frequency variation as transmitted.

Figure 5:
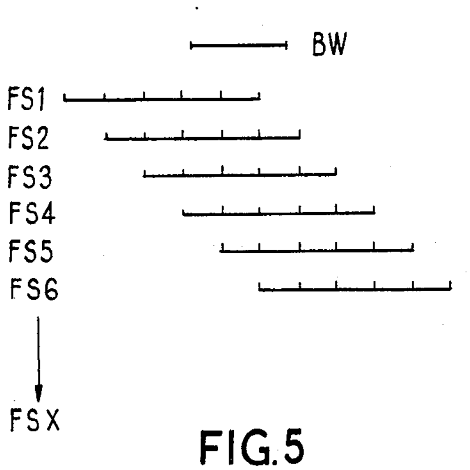
FIG. 5 is a diagram illustrating how the scanning is divided into frequency slots and FIG. 6 is a diagram showing part of the automatic control system of the terminal station.

In scanning each repeater in turn, considerable time is taken in commencing the scan at one frequency error limit and proceeding towards the other limit in order to detect and plot the filter characteristic on a pen and paper recorder. It is proposed that initially each repeater filter characteristic should be determined in the manner outlined above in order to measure the frequency discrepancy in each local oscillator as observed at oscillator TMO. It is then proposed to consider the overall and adjustment band of oscillator TMO as divided into a plurality of overlapping equal frequency slots as illustrated in FIG. 5. The bandwidth of each repeater pick-off filter is approximately half the width of each slot and it can be seen in the example illustrated that the third and fourth slots FS3 and FS4 wholly embrace the filter bandwidth BW.

As previously mentioned the frequency change of each local oscillator from that measured in the manner outlined above is determined to a large extent by temperature change during use and therefore the frequency slot which wholly embraces the filter characteristic for any particular repeater can be assumed to do so in the near future also. It is proposed that this information be used to considerably speed up the monitoring procedure of the system in programming the terminal equipment to operate on an automatic basis.

Referring again to FIG. 3, the output signal of the frequency synthesizer FS is fed also to a modulator RM which receives the test signal back from the repeater via band pass filter RLF. This modulator will produce regardless of the repeater being tested, a constant difference frequency. A phase detector PD is connected to receive this difference frequency via a band pass filter ILF and also a signal from an oscillator PO, which is tuned to the intermediate frequency expected from RM. When the frequencies from the modulator RM and the oscillator PO differ slightly the phase detector indicator will oscillate slowly until the frequencies are the same (by adjusting oscillator TMO) whence the indicator will remain stationary, thus indicating the fact. The frequency error of the repeater local oscillator is thus determined.

Figure 6:
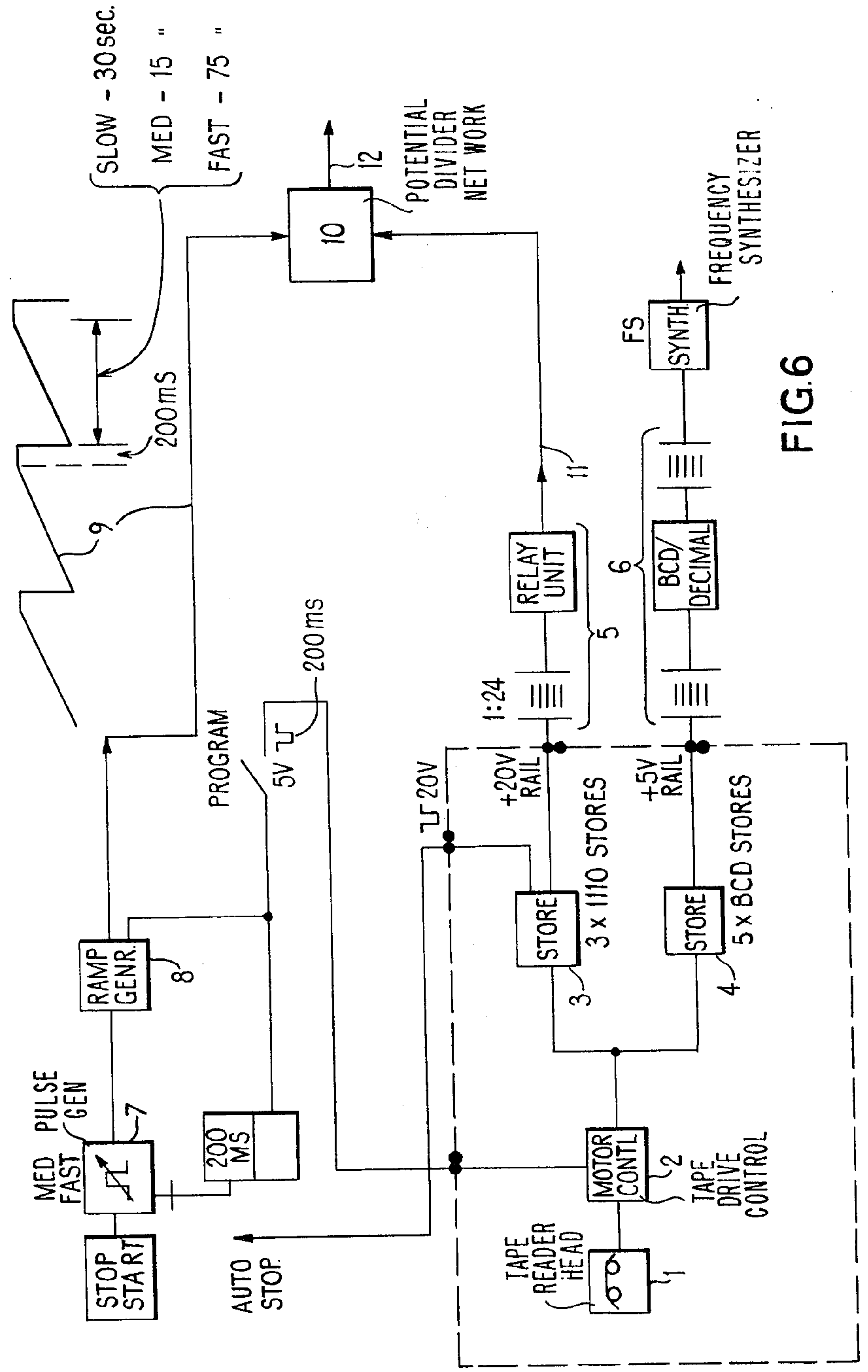

Referring now to FIG. 6 for discussion of an automatic control system, a tape reader head 1 is shown for reading a tape containing information derived from measurements using the circuit of FIG. 3. This tape reader head is controlled by a tape drive control 2 and the output is stored in respective stores 3 and 4. The information is used in selecting for each repeater the appropriate one of the plurality of frequency slots according to the error of the local oscillator and the appropriate frequency for the frequency synthesizer FS according to the pick off filter frequency of the pertaining repeater, via respective interface unit 5 and code converter 6. Simultaneously a stop/start control controlling a pulse generator 7 each time causes a ramp generator 8 to provide a ramp voltage 9 to a circuit arrangement 10 adapted to receive both the ramp voltage 9 and an offset voltage 11 representative of the particular frequency slot programmed for the pertaining repeater. The arrangement 10 can conveniently be a potential divider network giving an output voltage 12 controlling, for example, variable capacitance diodes in the oscillator TMO to provide the limited scan over the particular frequency slot. The speed of the scan is made variable by varying the frequency and the pulse width of the pulse generator 7.

It is possible that the frequency of each local oscillator in the repeaters will change from a value in the summer months embraced by one frequency slot to another value in the winter months due to changes in temperature which will require another frequency slot to be programmed. This can be done conveniently.

Thus a series of gain characteristics for all the repeaters can be produced by a tape program which program can be easily altered to cater for, for example, seasonal variations causing corresponding variations in the frequencies of the local oscillator. A steady change may also occur as the ageing process continues, both with respect to the control crystal and other associated components.

In recording the gain characteristic via each repeater in sequence automatically, a pen recorder is connected to receive the output from filter ILF in FIG. 3 and the speed of the recorder would be controlled according to the speed of the scan from the ramp generator by a connection not shown in the drawings. Each characteristic will appear as shown in FIG. 4 and is a measure of the loop gain.

While the principles of the invention have been described above in connection with specific apparatus and applications, it is to be understood that this description is made only by way of example and not as a limitation on the scope of the invention.

What is claimed is:

1. Apparatus for testing the performance of repeaters in a transmission link in which each repeater incorporates a filter tuned to an individual frequency band pertinent to that repeater and through which filter a test signal will pass during tests of that repeater, each repeater including means for changing the frequency of test signals received by the repeater to provide new test signals and returning the new test signals for testing, said new test signals often bearing a frequency error, the testing apparatus comprising: a frequency synthesizer for providing test signals over a transmit path at each of a plurality of predetermined discrete frequencies, means operable to change the discrete frequency of each test signal by an amount which can be varied according to the frequency errors introduced by frequency changes at each repeater, means for providing a reference-frequency signal, and a phase detector arranged to indicate when the reference-frequency signal and the new test signal received over a receive path from the repeater are the same, whereby the magnitude of the error can be determined.

2. Apparatus according to claim 1, wherein said means operable to change each discrete frequency comprises a variable oscillator and a modulator in the transmit path arranged to produce, for transmission to the repeaters, a modulation product of the signal from the variable oscillator and the signal from the synthesizer.

3. Apparatus according to claim 2, in which a modulator in the receive path is arranged to receive the new test signal from the repeaters and a signal derived from the frequency synthesizer prior to modulation for transmission and to produce a modulation product for detection by the phase detector.

4. Testing apparatus for testing the performance of repeaters in a transmission link: the link including a plurality of repeaters each having a filter tuned to a frequency individual to the pertinent repeater through which filter a test signal will pass in testing that repeater, each repeater including characteristics which will change the frequency of that test signal, after it has been transmitted through a part of the transmission link; the test apparatus comprising a frequency synthesizer for providing a test signal at any one of a plurality of predetermined discrete frequencies; automatic control means operable to vary the frequency of the test signal by an amount large enough to embrace all the variations of frequency occuring in the repeater, according to a program for testing each repeater sequentially, whereby the frequency of the transmitted test signal is varied from a first value to a second value to embrace only the bandwidth of the filter of the pertaining repeater under test; the frequency slot between said first and second values being smaller than the amount of frequency variation available from said automatic control means.

5. Apparatus according to claim 4 wherein said first and second channels feed a potential divider network having an output arranged to provide control signals to the automatic control means.

6. Apparatus according to claim 4, in which the control means has three channels providing respectively a ramp voltage for causing the frequency variation between said first and second values, one of a plurality of preset offset voltages representative of the particular frequency slot pertaining to the repeater to be tested and a control signal for selecting one of the plurality of discrete frequencies.

7. Apparatus according to claim 4, wherein said automatic control means comprises a variable oscillator and a modulator in the transmit path of the apparatus arranged to produce for transmission to the repeaters a modulation product of the signal from the variable oscillator and the signal from the synthesizer.

* * * * *